Oct. 2, 1951

F. M. CARROLL ET AL 2,569,799

RECORD SORTING DEVICE

Filed May 15, 1946

6 Sheets-Sheet 1

INVENTORS
F. M. Carroll
A. F. Smith
BY
ATTORNEY.

INVENTORS
F. M. Carroll
BY A. F. Smith
W. M. Wilson
ATTORNEY

Oct. 2, 1951

F. M. CARROLL ET AL

RECORD SORTING DEVICE 2,569,799

Filed May 15, 1946

6 Sheets-Sheet 3

INVENTORS
F. M. Carroll
BY A. F. Smith
ATTORNEY

Oct. 2, 1951

F. M. CARROLL ET AL

RECORD SORTING DEVICE 2,569,799

Filed May 15, 1946

6 Sheets-Sheet 4

INVENTORS
F. M. Carroll
A. F. Smith
BY
W. M. Wilson
ATTORNEY

Oct. 2, 1951

F. M. CARROLL ET AL

RECORD SORTING DEVICE 2,569,799

Filed May 15, 1946

6 Sheets-Sheet 5

INVENTORS
F. M. Carroll
G. F. Smith
BY
W. M. Wilson
ATTORNEY

INVENTORS
F. M. Carroll
BY A. F. Smith
J. W. Armbruster
ATTORNEY

Patented Oct. 2, 1951 2,569,799

UNITED STATES PATENT OFFICE 2,569,799

RECORD SORTING DEVICE

Fred M. Carroll, Binghamton, and Arthur F. Smith, Endicott, N. Y., assignors to International Business Machines Corporation, New York, N. Y., a corporation of New York Original application November 28, 1942, Serial No. 467,244. Divided and this application May 15, 1946, Serial No. 669,860

2 Claims. (Cl. 209—110)

This application is a division of our copending application Serial No. 467,244, filed on November 28, 1942 and now Patent 2,493,858, issued on January 10, 1950.

Other related divisions are: Serial No. 638,343, filed December 29, 1945, for a card feed with planetary gearing; Serial No. 664,938, filed on April 25, 1946 now Patent 2,566,927, for address printing under control of heading cards; and Serial No. 202,112, filed on December 21, 1950, for character printing devices with improved zoning controls and zero eliminating mechanism.

The invention relates generally to improved sorting devices and more particularly to means for offset stacking of heading cards in a record controlled tabulator.

An object of the invention is to furnish improved stacking devices which operate to segregate item and heading cards under control of sensing devices.

Other objects of the invention will be pointed out in the following description and claims and illustrated in the accompanying drawings, which disclose, by way of example, the principle of the invention and the best mode, which has been contemplated, of applying that principle.

*The illustrative machine*

Figure 1:
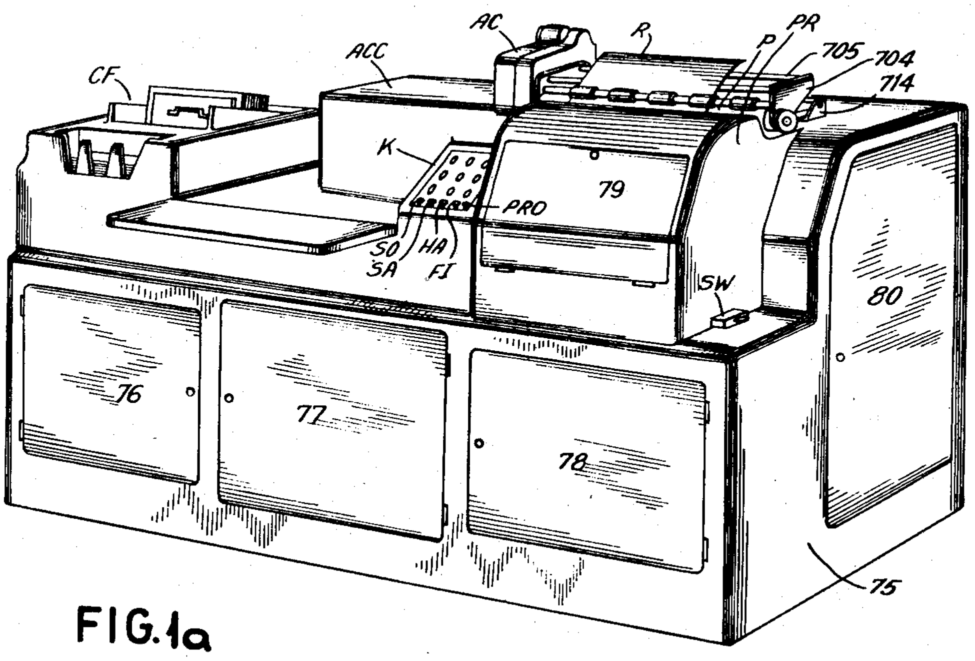
Fig. 1 is a perspective view of the entire machine.

A perspective view of the entire machine is shown in Fig. 1. There it is seen that a case 75 encloses the various operating units of the machine. At the upper left hand corner is a mechanism CF provided to feed and sense the perforated record cards. Extending across the rear of the machine is a portion ACC wherein is held one hundred orders or banks of accumulators assembled in two tiers with fifty separate orders in each tier. Near the center of the machine is a keyboard K upon which is mounted a series of five control keys and a set of nine control switches. At the right side of the machine is an extension containing the printing mechanism identified by the designation PR. Extending from this printing unit is a box containing the main switch SW. At the rear of the printing unit is a platen P holding the record sheet R, the movement of which is controlled by an automatic carriage mechanism AC of the kind shown in Patent No. 2,189,025. Across the front of the machine is a series of door openings for making accessible the parts of the machine requiring changes of record sheets or plugging connections. Door 76 covers a program device and door 77 covers the plug-board. When door 78 is open, a pair of relay gates may be swung outwardly to make inspection of the relays and the wiring connections. A door 79 covering the front of the printer unit PR is opened for access thereto when a change in zero elimination control is desired. Another door 80 located on the right wall of the case 75 is provided to give access to control sheet storage bins and a total impulse distributor.

*Frame work*

Figure 2:
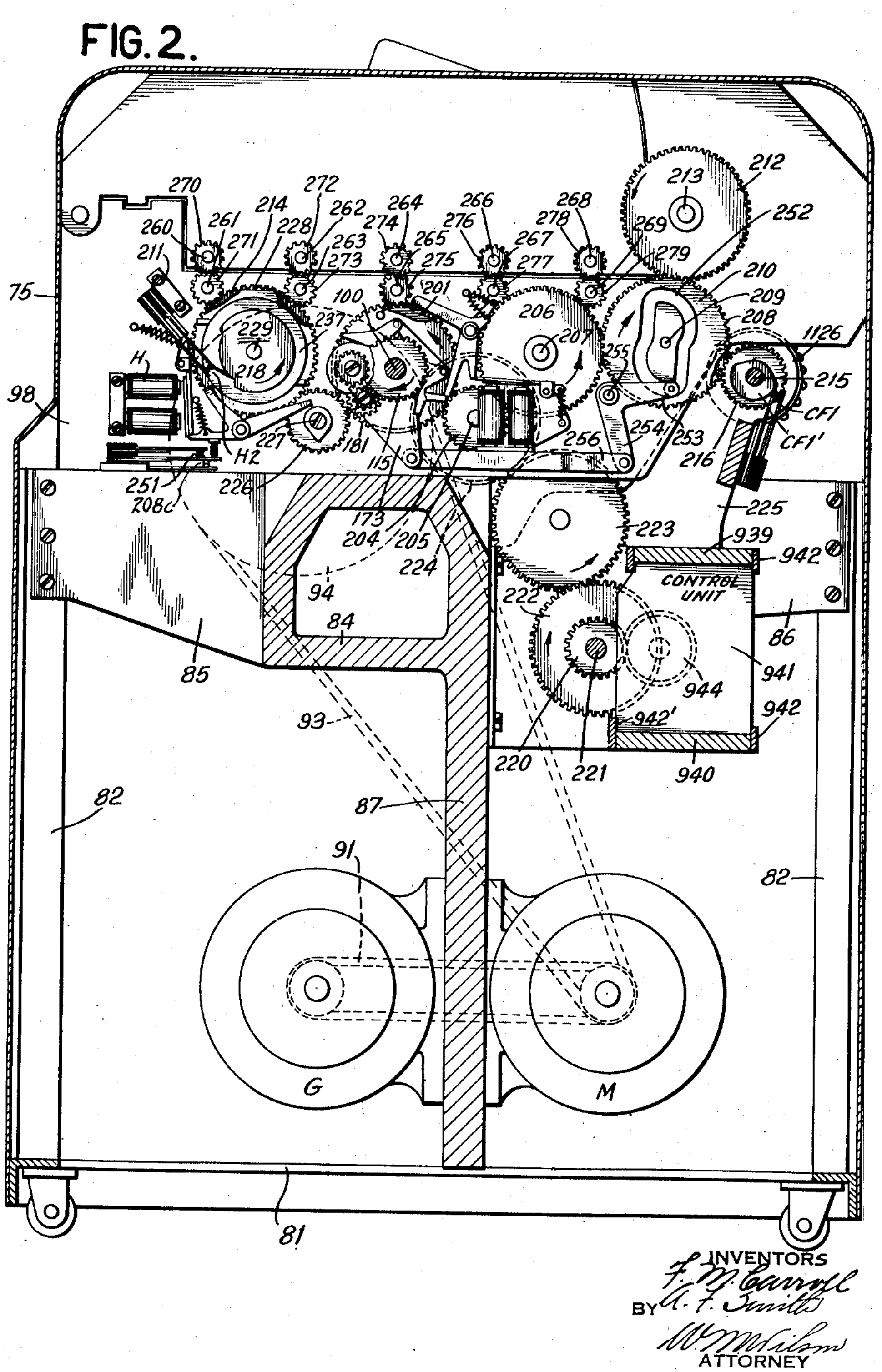
Fig. 2 is a sectional elevation view showing the clutch devices and drive gearing cooperating with the card feeding rollers.

The operating mechanism of the machine is suspended within a cage made up of a series of connected horizontal and vertical angle irons or bars. Referring to Fig. 2, it is noted that a series of horizontal angle irons are connected to form a base 81. Supported at the four corners of the base are vertical bars 82 and other bars are placed in intermediate positions to strengthen the center of the framework. The main support in the machine is located in the center of the cage of angle irons and extends from left to right through the full length of the machine. This main support is composed of a central hollow core 84 extending the entire length of the machine, and from it there extend substantial webs for supporting many units of mechanism. It is a large casting, formed as a unit with the extending webs branching therefrom.

In Fig. 2, which is a view looking toward the left side of the machine, it is seen that extending from the central core 84 is a pair of horizontal webs 85 and 86 extending to the left and right, respectively, and connecting the main support to the angle irons 82 situated at the left side of the machine. Also extending from core 84 is a large central vertical web 87 supported on the base 81 and extending along the entire length of the machine.

*The driving mechanism*

In Fig. 2 it is seen that a motor M is attached to the rear side of the vertical frame web 87. Opposite the motor M and attached to the other side of the web 87 is a generator G. Connecting the motor and generator is a belt 91 for driving the generator to create operating current whenever the motor M is operated from the usual alternating current source of power. The motor shaft extends toward the left beyond the generator shaft and carries a pulley around which is wrapped a belt 93 passing upwardly around a large driving pulley 94 connected to a spur gear 95 (Fig. 3) pivoted on a center 96 extending from one of the card feed unit frames 97. The driving motion is communicated through gear 95 to a large gear 99 (Fig. 4) attached to a main drive shaft 100 passing through the card feed unit.

At this point it is well to mention that the driving mechanism is not all operated with a uniform motion. Although the driving action of shaft 100 is communicated directly to the printing, accumlating, total taking, and other devices of the machine for operation in a uniform manner, other gearing devices associated with the card feed and group control mechanisms are driven through a gear 115 (Figs. 2, 4, 6 and 7) attached to shaft 100 and cooperating with a planetary gear train for accelerating the drive connections associated with the card feed for reasons explained more fully hereinafter. Shaft 100 rotates at the rate of only one revolution for two cycles of operation, but the shafts geared thereto are driven with a 1 to 1 ratio.

For purposes of connection to the devices driven with a uniform motion, shaft 100 extends toward the right of the machine and has attached thereto a gear for driving a gear train leading to the accumulating and program devices.

There are other driving devices the motions of which are not uniform but have accelerated intervals. Before discussing the operation of the driving mechanism for feeding and sensing a record card, it is believed well to point out the arrangements of index points on the record card and the influence such arrangements have on the card feeding drive.

*Perforated record cards*

Figure 1A:
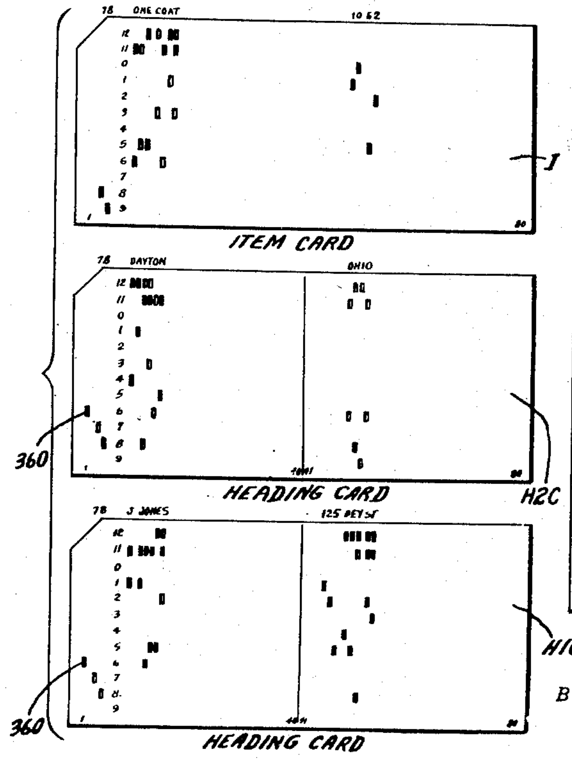
Fig. 1a shows sample item and heading cards.
Figure 1B:
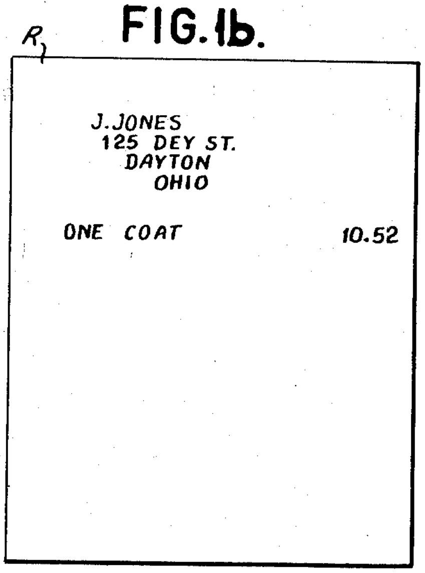
Fig. 1b shows an example of a printed report sheet.

The three cards illustrated in Fig. 1*a* are representative of the different cards found in a group relating to an account, a class, or related items having some other common origin. The two lower cards H1C and H2C are heading cards for controlling the printing of alphabetic matter, such as name, address, names of merchandise, etc. The top card I is an item card, many of which are associated with each pair of heading cards to carry numerical information regarding number, amount, price, size, etc. In order that more than one line of alphabet printing may be taken from each heading card, the card is divided into two halves and the sensing mechanism is provided with two print control stations. Usually, as the heading card passes through the sensing means, one line of alphabet printing may be derived from one-half the card, and then later, as it passes through the other sensing station another line of alphabet printing may be recorded from the perforated information appearing in the other half of the card.

Figure 3:
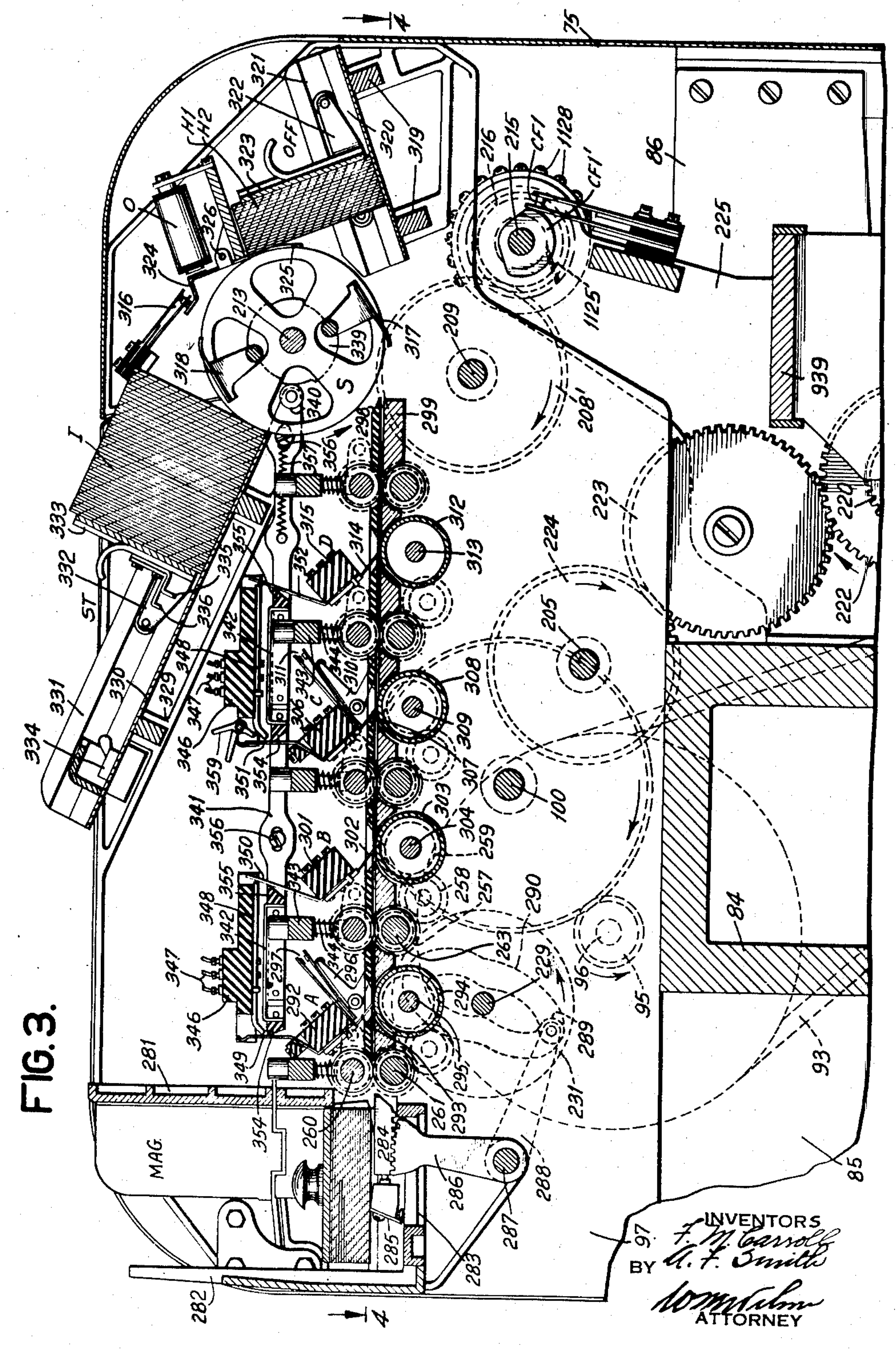
Fig. 3 is a sectional elevation view showing the card feeding and sensing devices.
Figure 4:
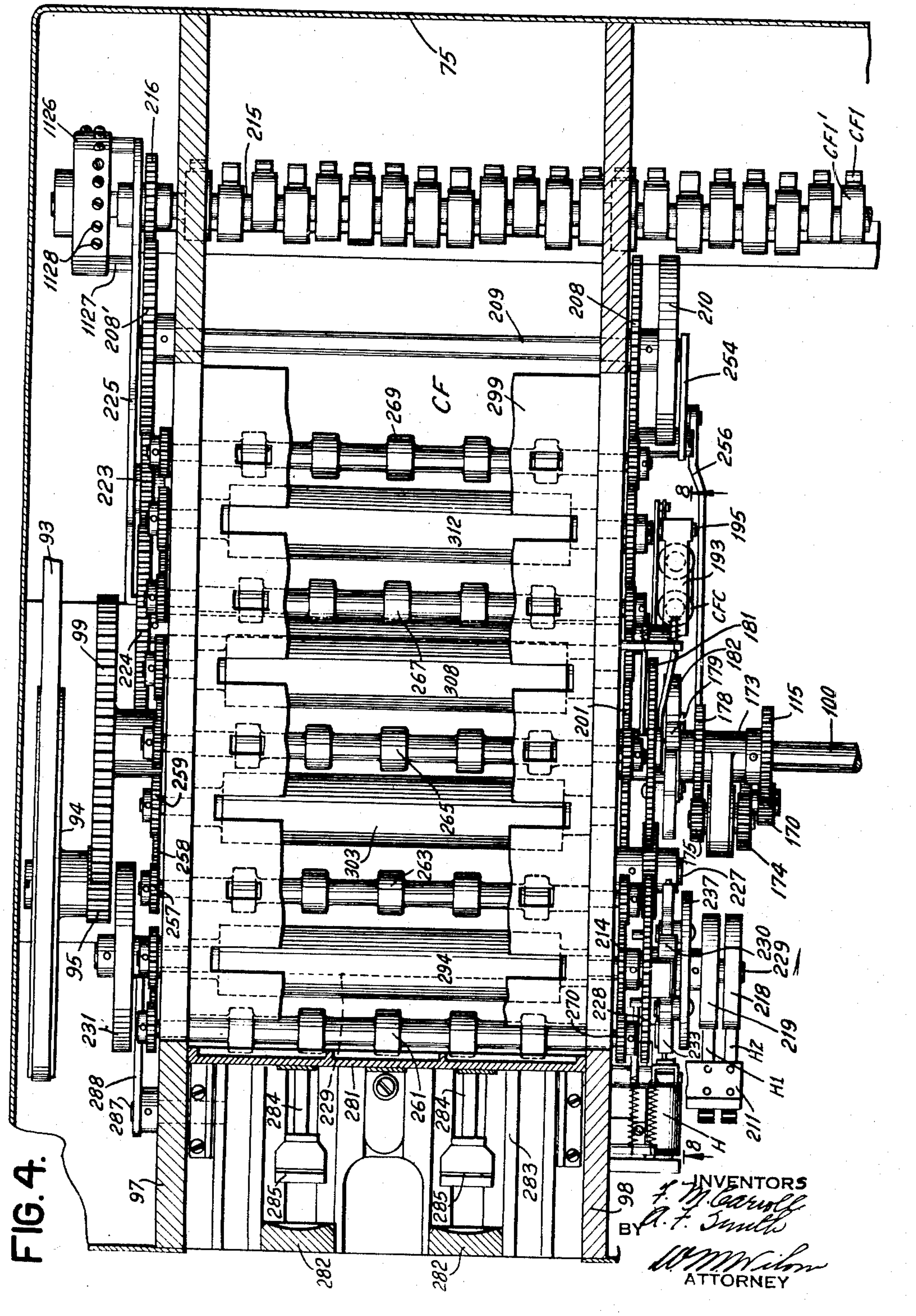
Fig. 4 is a sectional plan view showing the card feeding devices.

The path followed by the cards in passing through the sensing devices may be observed in Fig. 3. There it is seen that the cards are assembled in a magazine MAG at the left with the heading cards interspersed between related item cards I. The cards are picked off one by one from the bottom of the stack in the magazine and sent across the machine toward the right (i. e., toward the back of the machine when observed from the front) and through a series of four sensing stations lettered A, B, C and D. Each card passes a pair of sensing stations in a single cycle of operation. The brushes at the sensing station A comprise an upper zoning control while the next set of brushes B are devoted to control for printing. The next set of sensing brushes C from another or secondary zoning control, and the sensing devices at D comprise a second printing control station. After leaving the last sensing station D, the cards continue to move toward the right and are picked up successively by a stacker drum S which deposits them in one of two places. The first stacking station OFF is identified as an offset stacking station for receiving the heading cards which are thus segregated from the item cards carried further by the stacking drum S and deposited in the stack ST containing all item cards I. The card handling devices are described more fully hereinafter, reference here being merely for the purpose of describing the path of motion taken by a card when passing through the sensing stations.

The cards are ordinarily picked out of the magazine in evenly timed succession and at intervals adapted to place one card in cooperation with brushes at stations A—B while the advanced card is in a similar state of cooperation with the brushes at stations C—D. An exception is involved in the handling of heading cards in that successive feeding is interrupted as explained hereinafter under "Heading card control."

Referring again to Fig. 1*a*, it is noted that the cards each contain eighty vertical rows of index positions, each row having twelve index points, ten of which are allotted to digit representations in the form of perforations and two other upper positions 12 and 11 for zone control or special X and R control perforations. This is the ordinary Hollerith arrangement of index points on a perforated record. As is usual in machines of this kind, the vertical distance between index points is taken as a measure of machine cycle operation. Many machines have a sixteen point cycle, that is, they feed a card uniformly through the twelve vertical index positions under a sensing device and then have four additional and similar time intervals devoted to control operation.

In the present machine, a cycle of twenty points was found necessary to allow sufficient time for operations other than sensing operations. In one operating cycle of the present machine more than half of the operating time is consumed by the passage of the twelve vertically arranged index points on a record card under the sensing devices, and then eight other intervals of time similar to that consumed by the passage of a card from one index point to another are provided for control operations. The feeding motion is accelerated during the last third of each cycle.

In explaining the need for a card feed drive that is not uniform in motion, reference may be made to Fig. 3 wherein by comparison with the twelve points of width of the card it is seen that the card sensing stations A and C cannot be spaced close enough to be within twenty index point positions with respect to one another. In other words, a uniform motion of the cards across the machine under the sensing devices would not conform with the twenty point cycle found desirable for operation of the remainder of the machine. An amount of time greater than twenty intervals would be required to feed a card from station A to station C. Therefore, the card feeding devices are provided with planetary gearing for speeding up the motion of the card and all other cooperating devices during card feeding time other than the perforation sensing time. A pair of cards is moved with a uniform motion under a pair of sets of sensing brushes while the perforations are controlling printing. Then, immediately after this phase of the operation is ended, a set of planetary gears cooperates with the driving mechanism to accelerate the card movement and pass them through the space leading to the next pair of sets of brushes which is greater than the space equivalent to eight cycle index point intervals remaining in the operating cycle. The accelerating devices for the card feed mechanism will now be described.

*Card feed driving mechanism*

Figures 6, 7:
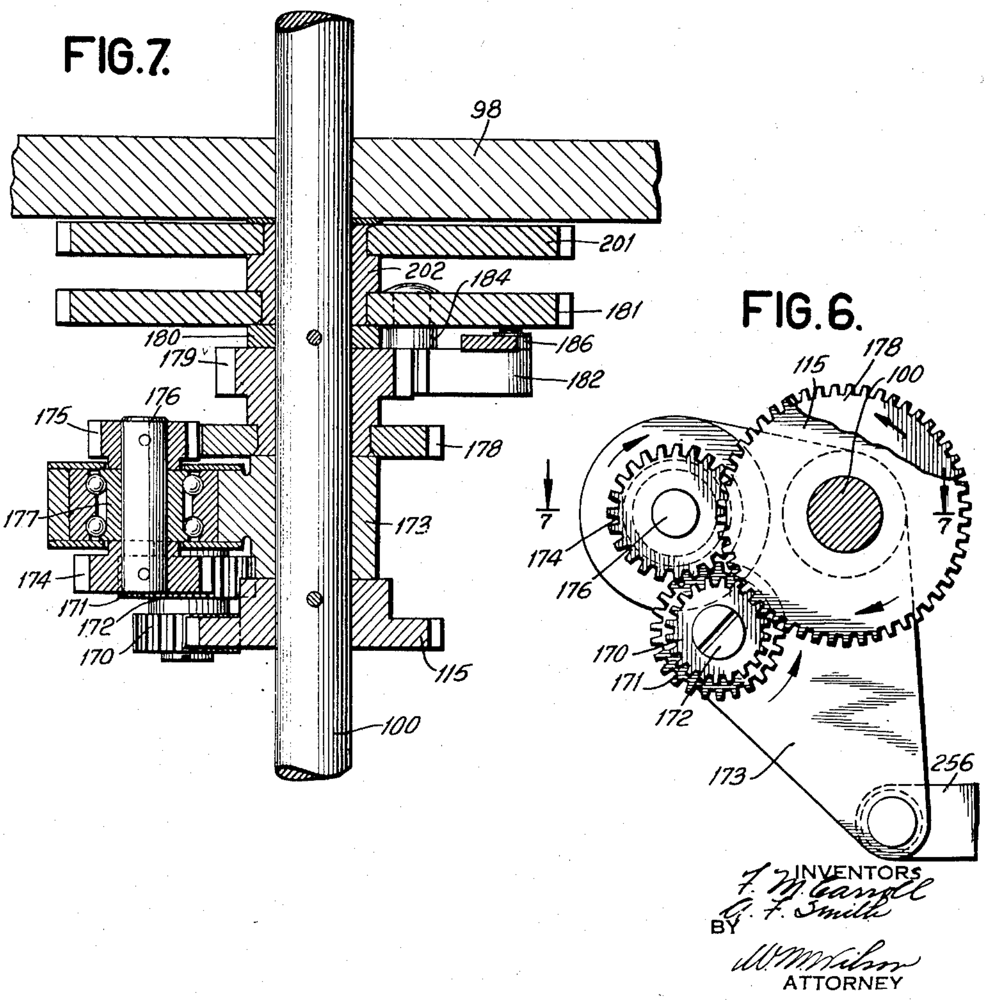
Fig. 6 is a detail view in side elevation showing the planetary gearing provided for accelerating the card feeding rollers.
Fig. 7 is a sectional plan view showing the card feed acceleration gearing.

As already pointed out with reference to Fig. 6, a gear 115 is fastened to the main driving shaft 100 which is constantly operated in a clockwise direction one-half revolution for each cycle as long as the motor M is operated. This gear 115 is the driving source of the card feeding, card stacking, group control and cam contact operating devices.

In Figs. 6 and 7, it is seen that this gear 115 meshes with the smaller gear 170 of a pair of joined gears 170, 171 loosely pivoted on a stud 172 projecting from the side of an accelerating lever 173 loosely pivoted on shaft 100. Also carried by lever 173 is a pair of planetary pinions 174, 175 which are connected by being pinned on the same stub shaft 176 running through a ball bearing 177 found in the end of an arm extending from lever 173. The planetary pinion 174 meshes with the gear 171 driven by gear 115 through pinion 170. The driving motion of gear 115 is carried directly through the chain of gearing 170, 171, 174 and 175 to another gear 178 attached to a notched clutch disk 179 loosely mounted on shaft 100. The direction of operation is not maintained so that, as drive gear 115 (Fig. 6) is operated in a clockwise direction, clutch disk 179 (Fig. 5) is turned in a counterclockwise direction.

Figure 5:
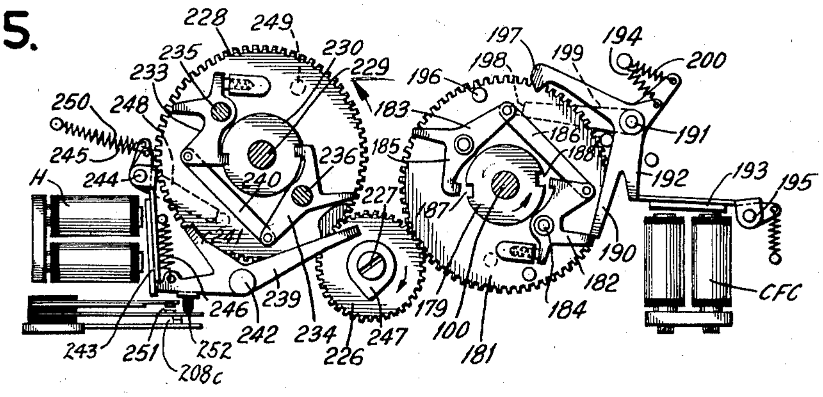
Fig. 5 is a detail view showing the clutching devices cooperating with card feeding mechanism.

Adjacent clutch disk 179 (Fig. 7) and separated therefrom by a collar 180 is a large gear 181 carrying a pair of clutch dogs 182, 183 (Fig. 5). These clutch dogs are pivoted at 184 and 185, respectively, and are joined by a link 186. Each is formed with a hook-shaped projection adapted to engage either of the notches 187, 188 formed in disk 179. They are normally prevented from doing so by an armature lever 190 which abuts against an extending arm projecting from either clutch dog. The armature lever 190 is pivoted at 191 on the feed unit frame 98 and formed with an extension 192 cooperating with an armature 193 assembled above the card feed control magnet CFC. A spring 194 attached to armature lever 190 tends at all times to rock it in a counterclockwise direction and so operates when the magnet CFC is energized. Then, the clutch dogs are allowed to engage the disk 179 and turn gear 181 in a counterclockwise direction (Fig. 5) as driven through the planetary gearing. Armature lever 190 is restored by one of two pins 196 projecting from side of gear 181 and cooperating with an extension 197 formed on the lever and placed in the path of the pins when the clutch connection is made.

Another pair of pins 198 projects from the side of gear 181 opposite to the side bearing pins 196, and they cooperate with a rebound preventing latch 199 also pivoted on center 191 and tensioned by spring 200 to snap into place as the clutch gear reaches the normal position.

The driving operation of gear 181 (Fig. 7) is communicated to a similar gear 201 connected thereto by a hub 202 loosely mounted on shaft 100. A chain of gearing reaching toward the rear of the machine is driven through operation of gear 201 while another assemblage of gearing near the front of the machine is driven by gear 181.

In Fig. 2, it is seen that gear 201 meshes with an idler gear 204 on a shaft 205. Cooperating with gear 204 is a larger gear 206 pivoted on a stud 207 extending from the side frame 98. The drive continues from gear 206 to a meshing gear 208 fastened on a shaft 209 carrying a box cam 210 for controlling operation of the planetary gears cooperating with the card feed drive. Gear 208 meshes with another gear 212 fastened to a shaft 213 carrying the stacker drum S shown in Fig. 3.

On the left side of the card feed unit (Fig. 4) the drive continues from shaft 209 to a shaft 215 carrying cams for operating card feed control contacts. On shaft 215 is fastened a gear 216 cooperating with a gear 208′ fastened to the end of shaft 209 which is driven through gear 208 as already mentioned.

A horizontal train of gearing is driven to operate the picker device and the feed rollers for handling the cards as they first appear leaving the magazine. Cooperating with one of the main card feed gears 181 (Fig. 2) is a small gear 226 loosely mounted on a stud 227 extending from the side frame 98. Also meshing with gear 226 is a gear 228 loosely mounted on a shaft 229 and carrying a clutch disk 230 (Fig. 5). Shaft 229 (Fig. 4) extends across the card feed unit, and to its left end is fastened a box cam 231 for controlling movement of a picker (Fig. 3) for pushing the cards out of the magazine in succession. On the right end of shaft 229 (Figs. 2 and 4) are fixed a pair of cams 218 and 219 for operating a pair of upper brush supply contacts H2 and H1, respectively, to control the card sensing impulses originating at sensing stations A and B.

Although gear 228 and clutch disk 230 (Fig. 5) are rotated continuously as long as the motor is operating, shaft 229, cams 218 and 219, the connected gearing and the box cam for operating the card moving devices to issue a card out of the magazine, are operated selectively under control of a magnet H which is effective to release a pair of clutch dogs 233 and 234 pivoted at 235 and 236 upon a disk 237 (Fig. 4) attached to shaft 229. The clutch dogs 233 and 234 are shown engaged to shaft 229. The clutch dogs 233 and 234 are shown engaged with disk 230 (Fig. 5) as they are normally when card feeding is operated successively. However, there are times when a heading card is to be held up before the sensing devices while a preceding card is advanced.

Then the heading card is sensed twice for successive printing from the same card.

The operation of the clutch devices connected with shaft 229 may be followed further with reference to Fig. 5 by noting that the dogs 233, 234 are connected by a link 240 and both are formed with extensions cooperating with a release lever 241 pivoted at 242. Clutch release lever 241 has a horizontal arm normally abutting against the lower end of armature 243 pivoted at 244 and operated by the hopper control magnet H. A spring 245 tends to rock the armature 243 away from magnet H to hold lever 241 cocked in a counterclockwise direction to release the clutch dogs. However, when the magnet is energized, the armature is rocked in a clockwise direction, releasing lever 241 for operation under control of spring 246 tending to turn it in a clockwise direction and move a vertical arm thereon in the path of the extensions on the dogs, so that they are rocked about pivots 235 and 236 and disengaged from the notched disk 230.

After a cycle of operation wherein the clutch is disengaged, a cam 247 attached to idler gear 226 goes into play to operate a long arm 239 on clutch release lever 241, so that the lever is rocked back in a counterclockwise direction to release the clutch dogs for normal engagement with the card magazine drive.

A rebound locking arm 248 is pivoted on the armature center 244 and disposed in the path of a pair of pins 249 extending from the side of gear 228. Spring 250 maintains the latch 248 in operating position so that, after the pin passes the front end of lever 248, it is prevented from turning backwards in a clockwise direction and the card feeding devices connected with shaft 229 are held in a normal position. The picker and other feeding parts in Figs. 2 and 3 are shown in a partly operated position.

Whenever the clutch release lever 241 (Fig. 5) is tripped by an operation of magnet H to suspend card issuance, a pair of contacts 251 is allowed to close by movement of an insulation block 252 mounted on the under side of the release lever 241. When the lever is restored, the contacts 251 are opened but, as soon as the lever is released, the contacts are allowed to close. They control contact switching attending heading card sensing as explained hereinafter. Other hopper clutch contacts 208c are assembled below contacts 251 and also operated by clutch lever 241 but, since they are normally closed, they are opened when contacts 251 close. Contacts 208c are used for heading card control to suspend group control functions as noted later.

Before going further into the explanation of the manner of issuing the cards out of the magazine and across the sensing devices, it is believed well to point out how the drive gearing already mentioned is accelerated for a portion of its cycle of operation. Referring to Fig. 2, it is observed that the box cam 210, already mentioned, is driven in a clockwise direction, and is formed with a cam groove 252 into which protrudes a roller 253 on one arm of a bell crank 254 pivoted at 255. The lower end of this bell crank 254 is pivotally attached to a link 256, the other end of which is articulated on the planetary gear carrying arm 173 (Fig. 6). These connections serve to move the gearing 170, 171, 174, 175 with respect to gears 115 and 178, so that instead of direct 1:1 ratio of operation between the driver 115 to the driven gear 178, there is additional movement imparted when the gear carrier 173 moves in a counterclockwise direction (Fig. 6) with respect to the driving gear 115.

The cam groove 252 (Fig. 2) is seen to have a pair of sharply curved lobes, each of which serves to osciliate the bell crank 254 up and down for each cycle as the box cam 210 rotates in a clockwise direction. In the first part of the motion of the cam, the bell crank is rocked in a counterclockwise direction and the planetary gear carrier 173 is also moved in a counterclockwise direction to advance the gearing and accelerate the movement at a time when the card is being brought to the sensing station. Then the connected planetary gears are shifted around the moving driving gear 115 and serve to speed up the operation of the gear 178 connected to the clutch disk. Through the clutch this accelerated motion is imparted to all the chains of gearing mentioned hereinbefore. In other words, the various gear trains deriving their motion from gears 181 and 201 (Fig. 7) are operated through a portion of the cycle in an accelerated manner and then later have a retarded movement as the planetary gears are restored. Deceleration is uniform and the drive gears are proportioned to compensate for it.

Figure 9:
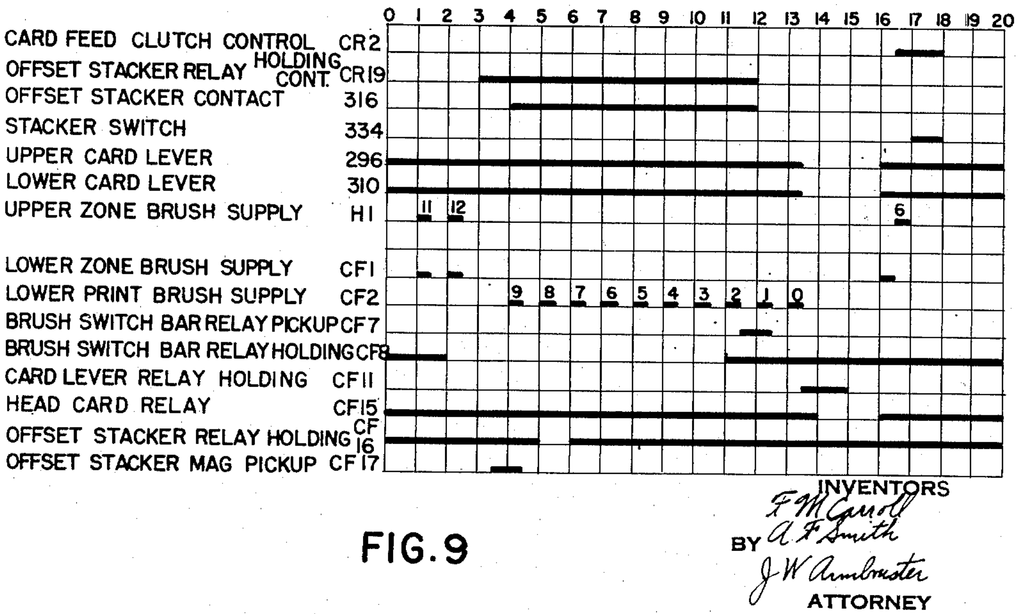
Fig. 9 is a time chart showing the sequence of operation of control contacts.

After one-half cycle (one-quarter revolution of cam 210 (Fig. 2)), the other lobe of the cam cooperates with the bell crank 254 and it pushes arm 173 in a clockwise direction. The planetary gears in moving clockwise (Fig. 9) have a decelerating effect on clutch gear 178 at a time when cards are being analyzed at stations B and D, but the retarding movement is uniform and compensated.

Gears 201 and 206 (Fig. 2) cooperate with six pairs of pinions for rotating the card feeding rollers cooperating directly with the card. Gear 201 operates in a counterclockwise direction and turns a pinion 275 in a clockwise direction to move the card toward the right. Meshing with pinion 275 is a similar pinion 274 on the opposite side of the card path. This cooperating pair of pinions is mounted on shafts 264 and 265 passing through the card feed side frames.

Two other pairs of card feed rollers are operated by the gear 206. The one pair of gears 276, 277 are fastened on shafts 266 and 267, and the lower gear 277 meshes with the driver 206. In a similar fashion shafts 268 and 269 carry the last set of feed rollers and pinions 278 and 279 and are driven by a gear 206. The gear 228 loosely mounted on shaft 229 near the magazine cooperates with two pairs of feed rollers to carry the cards along as they leave the magazine. The first pair of shafts 260, 261 carry pinions 270, 271, the latter meshing with the drive gear 228. In a similar fashion, shafts 262, 263 are rotated by pinions 272, 273 thereon cooperating with the drive gear 228.

The cards are issued out of the magazine (Fig. 3) by means of picker devices operated selectively under control of the clutch devices and magnet H. The magazine is built up with a wall 281 fastened between the card feed unit side frames 97 and 98. Opposite to wall 281 is a pair of vertical cards guides 282 (Fig. 4) fastened to a base plate 283 which is slotted to carry a pair of picker slides 284. These slides 284 are mounted directly beneath the table upon which the cards rest in the magazines, and each carries a blade 285 which extends above the card supporting surface far enough to engage the edge of the bottom card when the picker slide is moved to the extreme left position as viewed in Fig. 3.

The bottoms of the picker slides 284 are provided with rack teeth with which there meshes a pair of sectors 286 fastened to a shaft 287 carried in the feed unit side frames. Also attached to shaft 287 and extending outside the left side frame 97 (Fig. 4) is an operating arm 288 carrying a roller 289 fitted within the cam groove 290 cut into the box cam 231. As already explained, cam 231 is attached to the shaft 229 which rotates at all times except when magnet H is energized to disengage the clutch cooperating with shaft 229. The cam grove 290 is proportioned with a double lobe because the connections are operated through a half revolution for each cycle of operation of the machine.

When the cam is operated, the operating arm 288 is lifted rapidly and the picker slide 284 is moved toward the left (Fig. 3) to catch the forward edge of the bottom card. Directly thereafter, the cam groove reverses the motion of the picker oscillating parts and, with a diminished speed of operation, the slide 284 is moved toward the right to carry the bottom card into the first set of card feeding rollers carried by the shafts 260 and 261.

After the card is engaged by the first set of rollers, it is carried across the machine from left to right (Fig. 3) from one set of rollers to the the other and cooperating successively with the four sensing stations A, B, C and D. At the first sensing station A, an insulation bar 292 carries a set of downwardly projecting sensing brushes 293 cooperating with a contact roller 294 fastened to a shaft 295. While the card is in cooperation with brushes 293, it rocks a card lever 296 cooperating with a pair of card lever contacts 297 which are closed as long as a card is at the sensing station A. The card is confined to a straight line direction of motion between the various sets of rollers by a pair of slotted plates 298 and 299 extending along the card path on both sides of the line of contact between the upper and lower feed rollers.

After the card passes under the first set of brushes 293, it is carried along by the rollers 262, 263 to the sensing station B, wherein a block 301 carries a set of brushes 302 cooperating with a contact roller 303 fastened to shaft 304. The card is shift further to the left by rollers 264, 265 to station C wherein a carrying block 306 forms a mounting for a set of brushes 307 cooperating with a contact roller 308 on a shaft 309. At this station another card lever 310 is pivoted in the path of the card and, when operated by the card, closes a second pair of card lever contacts 311.

The final sensing station D is reached when the card is advanced by the feed rollers 266, 267, and there the card passes over a contact roller 312 cooperating with a set of brushes 314 fastened to an insulation block 315. After passing the last brush station D, the card is carried into the stacker drum S by means of the feed rollers 268, 269. As the card projects beyond plates 298, 299, it is engaged by one of a pair of grippers 317, 318 pivotally mounted on the drum S. This drum is rotated with shaft 213 in a counterclockwise direction to deposit a card in one of the two card receivers or stackers.

The first stacker is the one for receiving the heading cards, and it is supported on a frame comprising two rectangular bars 319 fastened across the feed unit side frames. Secured above the frame 319 is a base plate 320 formed with a horizontal slot 321, which guides a carriage 322 with a cross plate 323 pressing the deposited cards against the stacker drum S. The cards normally pass this first offset stacking station or bin OFF because the majority of the cards are item cards which are supposed to go to the second stacker. However, when a magnet O is operated, its armature 324 places an elongated deflector 325 in the path of the card as it is carried by one of the clips or grippers 317, 318. When magnet O is operated, it is a sign that the card is a heading card and is supposed to be deposited in the first stacking station. Then, the armature 324 is rocked in a clockwise direction about pivot 326 and the deflector 325 protrudes within the outer periphery of drum S and engages the forward edge of the heading card and presses it back against the group of cards in front of plate 323 as the stacker clip passes and continues to rotate in a counterclockwise direction.

Every time the offset stacker magnet O (Fig. 6) is operated to deposit a heading card in stacker OFF, an upper extension on armature 324 presses a pair of contacts 316 into a closed position. The control exercised by contacts 316 is explained with reference to the wiring diagram.

The stacker ST for the item cards I is held on a frame 329 fastened at an angle between the feed unit side frames. On frame 329 is a base plate 330 and a pair of grooved side walls 331 between which the cards are assembled. Along the grooved side walls there rides a carriage 332 to which is attached a pressure plate 333 for holding the cards upright. A switch 334 is mounted on the base plate 330 near the upper end and in alignment with a rearward extension or projection 335 on the pressure plate 333. As the stacker ST becomes filled, plate 333 and projection 335 move to the left (Fig. 3) against switch 334 to operate it to "off" and stop the machine. A second, shorter extension 336 is placed on plate 333 to throw the knob of switch 334 to the "on" position when the plate is moved to the right after the stacked I cards are removed.

The four contact rollers 294, 303, 308 and 312 are driven by gearing located near the left side frame 97 (Fig. 3) of the feed unit. Attached to each of the lower feed rollers 261, 263, 265 and 267 is a pinion 257 in mesh with an idler pinion 258 which drives a contact roller through a pinion 259 fastened thereon. Because of the proportions of the drive gearing, the contact rollers are moved in synchronism with passage of the card through the sensing stations.

Attached to the right end of the shaft 229 (Fig. 4) are the two cams 218 and 219 for operating the pair of contacts H2 and H1 in timed relation with the operation of the picker. The contacts are mounted on, but insulated from, an extension block 211 fastened to frame 98.

*Heading card control*

Figure 8:
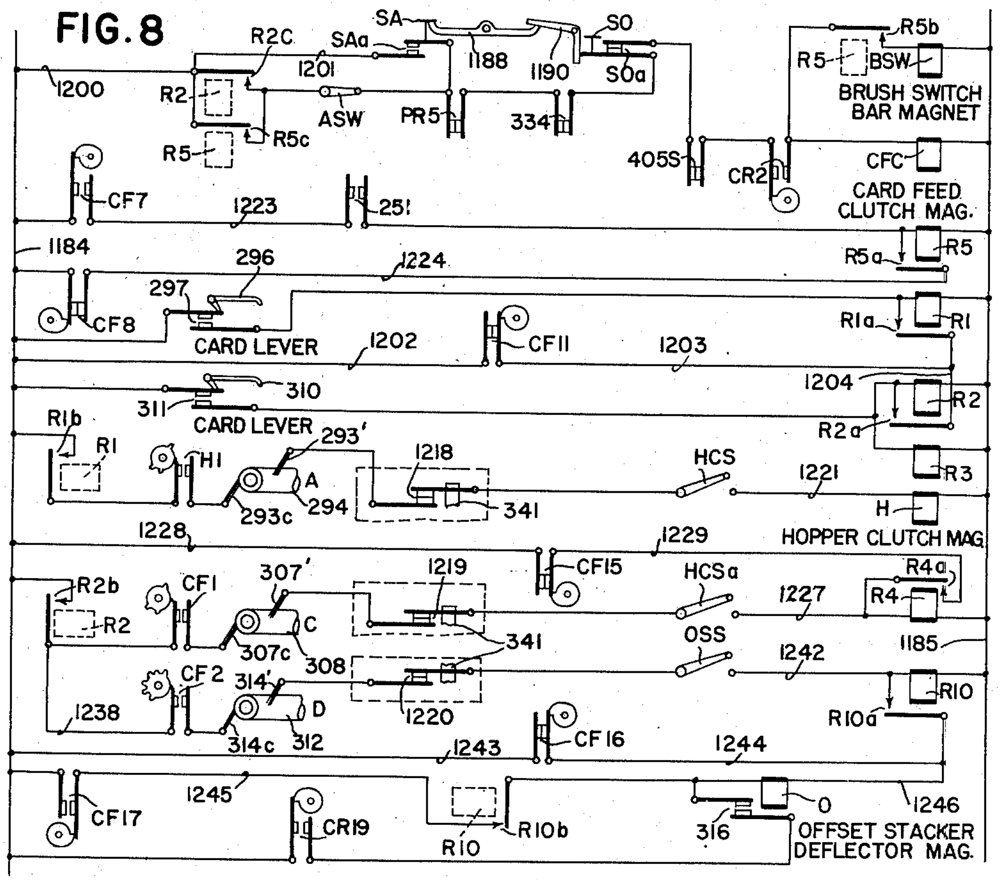
Fig. 8 is a wiring diagram illustrating the electrical controls associated with the offset stacking devices.

When heading cards are used and a plurality of printing impressions are to be effected from each card, a number of switches is closed in the machine. The switches HCS, HCS*a* and OSS (Fig. 8) are manually operated to make effective magnets and relays causing heading card control. These three switches are in series with three contacts 1218, 1219, and 1220 also in series with three card reading brushes at the A, C and D stations. A slide 341 is cam operated (Fig. 3) to open ordinary contacts and cut out zoning and digit impulses at proper times during a card reading cycle. Although the three contacts are associated with the zone switching controls, they are not disturbed by slide 341 but remain closed throughout all machine operations. They are connected to brushes in the first column position in alignment with the position occupied by perforation 350 (Fig. 1*a*) which they are designed to sense. Contacts 1218 are connected to brush 293' in the first position of sensing station A, contacts 1219 are connected to brush 307' in the first position of sensing station C, and contacts 1220 are connected to brush 314' in the first position of sensing station D.

When a heading card is detected at the first sensing station A, a hopper control magnet H is operated to suspend movement of the heading card and prevent movement of cards out of the magazine, so that the preceding card can move alone to clear the path for print control from the upper brushes B and multiple print operations. The circuit for hopper control can be traced from line 1185 at the right, thence through hopper clutch magnet H, wire 1221, switch HCS, contacts 1218, brush 293', through a perforation 360 in the heading card H1, contact roller 294, common brush **293*c* and distributor contacts H1 and card lever relay contacts R1*b* to line 1184**.

The hopper clutch magnet H (Fig. 2) not only operates to open the clutch connections to the magazine feed but it also serves to operate pairs of contacts **208*c* and 251 for effecting other heading card control. The contacts 208*c* open to suspend group control operation while heading card operation is taking place. Since the group control operation is of no direct concern herein, the complete circuit with contacts 208*c* is not shown in Fig. 8, but is illustrated in the parent case, not Patent 2,493,858. The other hopper control contacts 251 are closed in series with a relay R5. The complete circuit through relay R5 includes line 1184, cam contacts CF7, wire 1223, contacts 251, relay R5 to line 1185. The relay closes holding contacts and a circuit is established through line 1184, cam contacts CF8, wire 1224, holding contacts R5*a*, relay R5, and line 1185. Relay R5 not only operates the associated holding contact but it also operates two other pairs of contacts in series with the card feeding control circuit. One of these connections, contacts R5*b*, is in series with the magnet BSW for operating switch contacts. This magnet is effective for alternating printing control after the heading card passes station B. Turning back to Fig. 8, it is seen that both contacts R5*b*** and the brush switch magnet BSW are arranged in parallel with the card feed clutch magnet CFC and remain energized while the card feed is maintained to feed the delayed heading card.

The third set of relay contacts R**5*c* is arranged in shunt around lower card lever relay contacts R2*c*. They maintain card feeding operation until the heading card passes through the fourth sensing station. As a heading card continues to move through the card sensing devices, it passes under station C and there connections are established to make effective a relay R4 for causing many controls needed in connection with consideration of heading cards. The relay is picked up by a circuit including line 1185, relay R4, wire 1227**, switch HCS*a*, contacts 1219, brush 307' in the first column, the special perforation in the heading card, contact roller 308, common brush **307*c* to distributor contacts CF1 and relay contacts R2*b* to line 1184. A holding circuit is established for relay R4 through line 1184 (Fig. 8), wire 1228, cam contacts CF15, wire 1229, holding contacts R4*a*, relay R4, and line 1185**.

Relay R4 operates to open contacts in series with the automatic control circuit to disable the circuit while heading cards are passing through the machine.

A third contact is operated by relay R4 for setting up circuit connections to control the printing of zeros. During printing under control of heading cards, it is desired that zeros be printed in address names and numbers to the left of the amount columns.

A fourth set of contacts operated by relay R4 are connected in a card counting circuit for either counting all cards or counting cards other than heading cards.

As the heading card passes through the last sensing station D, it sets up a circuit for the energization of relay R10 which controls the offset stacking of the heading cards. All cards pass the offset station, but the item cards are allowed to continue on to the main stacking station while the heading cards are retained at the intermediate station OFF. The circuit for the stacking control relay passes through line 1185 (Fig. 8), relay R10, wire 1242, the closed offset stacking switch OSS, contacts 1220, brush 314' in the first column position, then through the special perforation 360 in the heading card H1, contact roller 312, common brush **314*c*, distributor contacts CF2, wire 1238 and relay contacts R2*b* and line 1184. The stacker relay then operates contacts R10*a* to set up a holding circuit, the circuit following a path along line 1184 to wire 1243, cam contacts CF16, wire 1244, contacts R10*a*, relay R10, and line 1185**.

Relay R10 operates other contacts R**10*b* in series with the offset control magnet O. The circuit through magnet O involves line 1184, cam contacts CF17, wire 1245, relay contacts R10*b*, magnet O, wire 1246, contacts R10*a*, relay R10 and line 1185. Turning to Fig. 3, it is noted that the magnet O places the deflector 325 in the path of the cards carried by the stacker drum S and causes the heading cards to be deposited in the stacking station OFF. There it is also noted that the armature of magnet O operates to close a pair of contacts 316. Turning back to Fig. 8, it is seen that these contacts 316 are arranged in series with magnet O and serves as part of a sustaining circuit including cam contacts CR19**.

It is believed well to summarize the various operations caused by heading card control. The sensing of the first heading card causes energization of the hopper clutch magnet. This clutch disengages for the purpose of retaining the first heading card at the upper brushes, i. e. short of entry under the brushes at station B, while the preceding card passes the lower brushes for item printing purposes. The following card cycle will then be devoted to printing from the heading card under the upper brushes. This is accomplished by unlatching the brush switch bar from the high cam position by the same impulse used to energize the card feed clutch magnet. This impulse in energizing the switch bar magnet BSW must pass through a switch bar relay contact R**5*b*, the relay R5 having been picked up by card feed contact CF7 in the cycle that the hopper clutch remained disengaged. A CF contact CF8** is then used to hold the relay circuit until early in the following card cycle. It should be noted that the following cycle may not be a card cycle and, therefore, switch bar latching will be delayed until a card feed clutch engaging impulse is initiated.

The brush switch bar tends to remain in the lifted position during the zoning and printing time. When the magnet BSW is tripped, the bar shifts the printing control from columns 2 to 40 of the upper brushes to the columns 41 to 80 of the lower brushes. Lower brushes in columns 2 to 40 are controlled by a brush cutout bar which remains in the closed contact position except when the heading card is passing the lower brushes and also when printing from the heading card at the upper brushes.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine controlled by two classes of records bearing indicia representing accounting data, one of said classes of records bearing special indicia, a plurality of sensing stations with means for sensing said indicia, means for feeding said records one by one past said sensing means, means under control of said sensing means for operating machine controls, a pair of separate stackers for said classes of records, said stackers being displaced in the path of said records beyond said sensing means, means for sensing said special indicia, a common stacking drum around which said stackers radiate outwardly and are both cooperatively related thereto, said drum being situated beyond said sensing means and mechanically separated from all of said sensing stations and having means to carry the records to said stackers, the first of said stackers being with 180° of the point where a record is grasped by said carrying means beyond the sensing means, a deflector cooperating with said carrying means on the drum for directing one class of records into the first of said stackers, means for carrying the other class of records into the other stacker, a magnet for operating said deflector, and means under control of said special indicium sensing means for operating said magnet, whereby a record is taken off said drum and deposited in said first stacker in less than 180° of rotary movement of said drum.

2. In a machine controlled by two classes of records bearing indicia representing accounting data, one of said classes of records bearing special indicia, a plurality of sensing stations with means for sensing said indicia, means for feeding said records one by one past said sensing means, means under control of said sensing means for operating machine controls, a pair of separate stackers for said classes of records, said stackers being displaced in the path of said records beyond said sensing means, means for sensing said special indicia, a common stacking drum around which said stackers radiate outwardly and are both cooperatively related thereto, said drum being situated beyond said sensing means and mechanically separated from all of said sensing stations and having means to carry the records to said stackers, a deflector cooperating with said carrying means on the drum for directing one class of records into the first of said stackers, means for carrying the other class of records into the other stacker, a magnet for operating said deflector, means under control of said special indicia means for operating said magnet to shift the deflector and take a record off the drum and deposit it in said first stacker in the initial turn of the rotary movement of said drum, a pair of contacts operated by said deflector, and a holding circuit for said magnet including said pair of contacts.

FRED M. CARROLL.
ARTHUR F. SMITH.

REFERENCES CITED

The following references are of record in the file of this patent:

UNITED STATES PATENTS

| Number | Name | Date |
|---|---|---|
| 1,633,936 | Ford | June 28, 1927 |
| 1,667,881 | Campbell | May 1, 1928 |
| 1,710,691 | Carroll | Apr. 30, 1929 |
| 1,935,442 | Goff | Nov. 14, 1933 |
| 2,251,221 | Cleven | July 29, 1941 |
| 2,359,670 | Page | Oct. 3, 1944 |